United States Patent [19]
Russ et al.

[11] Patent Number: 5,787,933
[45] Date of Patent: Aug. 4, 1998

[54] METHOD OF OBTAINING A LEAKPROOF CONNECTION BETWEEN A TUBE AND A SLEEVE

[75] Inventors: Jakob Russ, Römerberg; Abdullah-El-Baqui Majumdar, Mannheim, both of Germany

[73] Assignee: ABB Reaktor GmbH, Mannheim, Germany

[21] Appl. No.: 390,106

[22] Filed: Feb. 17, 1995

[30] Foreign Application Priority Data

Feb. 25, 1994 [DE] Germany ............... 44 06 167.6

[51] Int. Cl.⁶ .................................... F16L 55/16
[52] U.S. Cl. .................... 138/98; 138/978; 29/402.09; 29/890.036
[58] Field of Search .................. 138/97, 98, 89; 228/107, 119, 183; 290/421.2, 402.09, 523, 890.036

[56] References Cited

U.S. PATENT DOCUMENTS

| | | | |
|---|---|---|---|
| Re. 30,802 | 11/1981 | Rogers, Jr. | |
| 3,411,198 | 11/1968 | Berman et al. | 29/421.1 |
| 3,562,887 | 2/1971 | Schroeder et al. | 29/421.1 |
| 3,781,966 | 1/1974 | Lieberman | 138/98 X |
| 4,410,009 | 10/1983 | Blum | 138/99 X |
| 4,505,017 | 3/1985 | Schukei | |
| 4,592,577 | 6/1986 | Ayers et al. | 138/98 X |
| 4,739,916 | 4/1988 | Ayers et al. | 138/98 X |
| 4,941,512 | 7/1990 | McParland | 138/98 X |
| 5,368,075 | 11/1994 | Baro et al. | 138/98 |
| 5,400,827 | 3/1995 | Baro et al. | 138/98 |

FOREIGN PATENT DOCUMENTS

| | | |
|---|---|---|
| 0 121 137 | 10/1984 | European Pat. Off. . |
| 0214670 | 3/1987 | European Pat. Off. . |
| 0291003 | 11/1988 | European Pat. Off. . |
| 0462530 | 12/1991 | European Pat. Off. . |
| 236 584 | 6/1986 | German Dem. Rep. . |

Primary Examiner—Patrick Brinson
Attorney, Agent, or Firm—Herbert L. Lerner; Laurence A. Greenberg

[57] ABSTRACT

A method of obtaining a leakproof connection between a metallic tube having a leak and a metallic sleeve extending over the leak, includes expanding the sleeve being formed of a material having given strength values against an inner wall surface of the tube being formed of a material having strength values greater than the given values. In order to bridge a gap due to spring-back without the aid of an additional component of a shape memory alloy, a sleeve material having strength values lower than those of the material of the tube is used. A leakproof connection is obtained as the result of the greater spring-back of the tube.

3 Claims, 2 Drawing Sheets

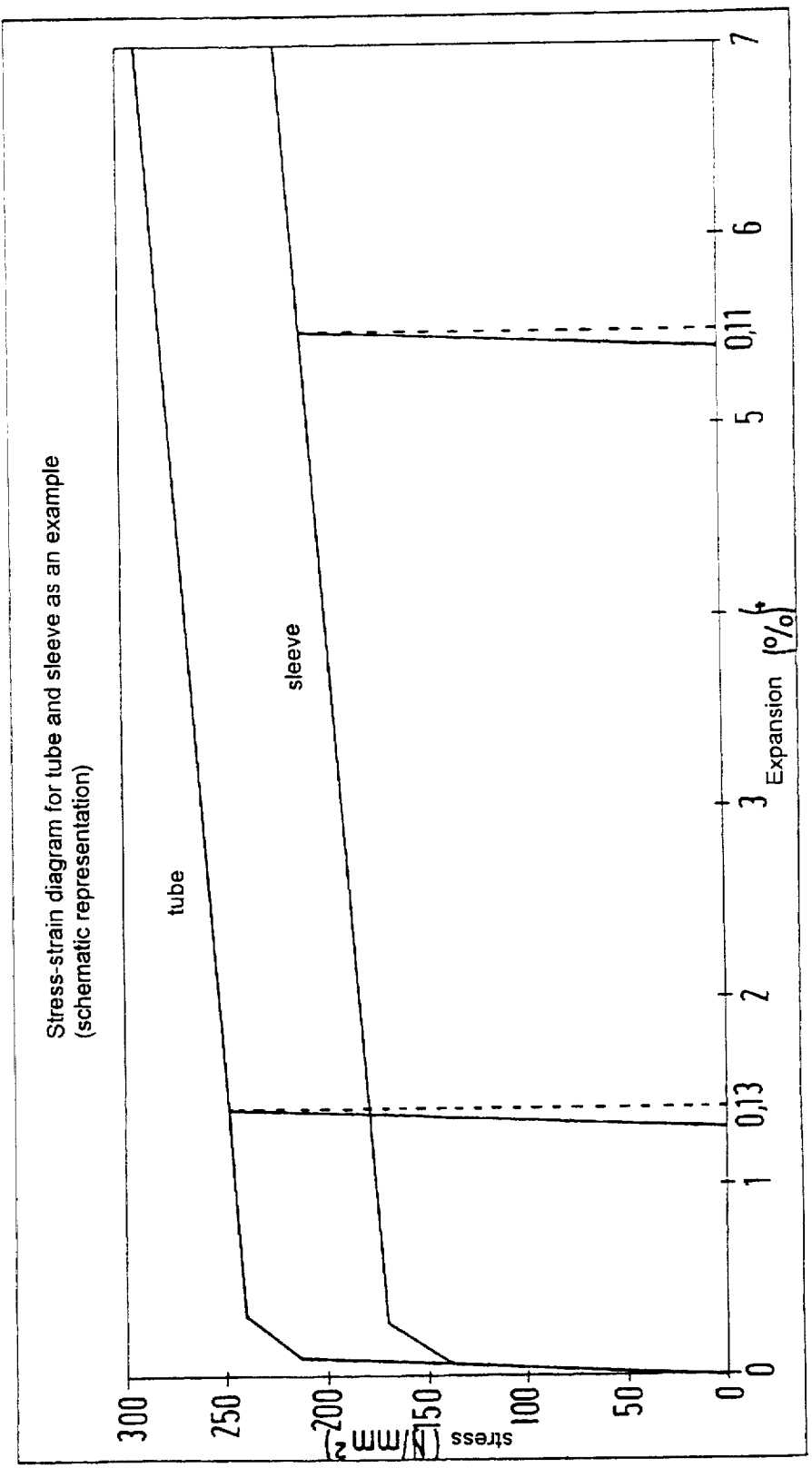

1

METHOD OF OBTAINING A LEAKPROOF CONNECTION BETWEEN A TUBE AND A SLEEVE

BACKGROUND OF THE INVENTION

Field of the Invention

The invention relates to a method of obtaining a leakproof connection between a metallic tube which has a leak and a metallic sleeve extending over the leak, in which the sleeve is applied against an inner wall surface of the tube by an expansion technique.

Such a method is known from German Patent DE-PS 40 08 252, corresponding to U.S. Pat. No. 5,400,827. The spring-back gap formed therein after the expansion has been effected is bridged with the aid of a component of a shape memory alloy which is associated with the peripheral surface of the sleeve. This additional component of a shape memory alloy develops its sealing action only after heat has been applied. Imponderables in the manufacture of the shape memory alloy lead to uncertainties with respect to the sealing action that is obtainable.

SUMMARY OF THE INVENTION

It is accordingly an object of the invention to provide a method of obtaining a leakproof connection between a tube and a sleeve, which overcomes the hereinafore-mentioned disadvantages of the heretofore-known methods of this general type, which ensures a leakproof connection after completion of the expansion process and which requires neither additional components nor the application of heat.

With the foregoing and other objects in view there is provided, in accordance with the invention, in a method of obtaining a leakproof connection between a metallic tube having a leak and a metallic sleeve extending over the leak, the improvement which comprises expanding the sleeve being formed of a material having lower strength values against an inner wall surface of the tube being formed of a material having higher strength values.

Through the selection of a sleeve material of this kind, a connection having no gap and therefore being leakproof is obtained, because the tube springs back to a greater extent than the sleeve after the plastic expansion has been effected. This measure results in a "negative gap width" of a few μm, thus forming a leakproof compression joint.

In accordance with a concomitant mode of the invention, a sleeve material is selected which has a coefficient of thermal expansion that is equal to or higher than the coefficient of thermal expansion of the tube material. It is thus ensured that the "negative gap width" can achieve its sealing action at any temperature at which the repaired tube is used.

Other features which are considered as characteristic for the invention are set forth in the appended claims.

Although the invention is illustrated and described herein as embodied in a method of obtaining a leakproof connection between a tube and a sleeve, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a stress-strain diagram for a tube material and a sleeve material.

DESCRIPTION OF THE PREFERRED EMBODIMENTS

Figure 1:
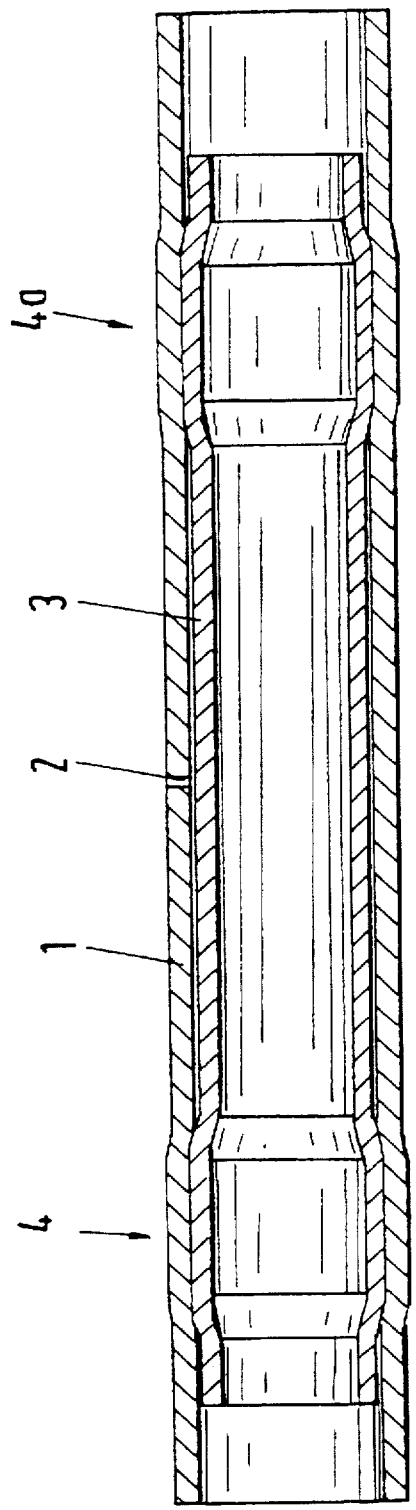
FIG. 1 is a diagrammatic, sectional view of a part of a tube with a sleeve.

Referring now to the figures of the drawing in detail and first, particularly, to FIG. 1 thereof, there is seen a portion of a metallic tube 1 that has a leak 2, over which a metallic sleeve 3 extends. The leak is situated between two expansion regions 4, 4a. It is necessary to have a permanent plastic deformation of the expansion regions, which is visible in the drawing. This results in a leakproof connection which is obtained, according to the invention, by using a sleeve material that has strength values lower than those of the material of the tube. The values can be represented in a stress-strain diagram. In this connection reference is made to FIG. 2 from which, for example, a stress difference of 70N/mm$^2$ can be seen between a lower curve symbolizing the sleeve material and an upper curve symbolizing the tube material.

The tube 1 to be repaired is provided with an inside diameter of 16.87 mm, for example. In order to enable it to be inserted without problems, the sleeve 3 has an outside diameter of 16.2 mm, for example. The expansion first causes the plastically deformed sleeve to bear against the inner wall surface of the tube and during the expansion process, which is continued to a predeterminable extent, it brings about the plastic deformation of the sleeve and of the tube.

If the tube has a spring-back of 0.13% because of its stress values, with an inside diameter of 16.87 mm, in the given tube-sleeve pairing, this spring-back leads to a reduction of the inside diameter by 0.0219 mm. If the material of the appertaining sleeve has a higher strength value and thus a greater spring-back of 0.14%, with an outside diameter of 16.2 mm, this leads to reduction of the outside diameter of the sleeve by 0.0227 mm. The outside diameter of the sleeve in this example has a spring-back which is greater by 0.0008 mm=0.8 μm, thus leading to a gap width of 0.4 μm. Leak-tightness is thus not achieved.

If, on the other hand, in accordance with the measures of the invention, the strength and therefore also the spring-back of the sleeve have lower values than the tube, it gives rise to the following situation, which is described in connection with another example. A spring-back of the tube of 0.13%, with an outside diameter of 16.87 mm, leads to a modification of the inside diameter by 0.0219 mm, as in the first example. On the other hand, the sleeve having a spring-back of 0.11% and an outside diameter of 16.2 mm, exhibits a modification of diameter of only 0.0178 mm. The difference of 0.004 mm (4.0 μm) leads to a radial "negative gap width" of 2.0 μm, that is to say 2.0 μm interference at the interface between the tube and the sleeve. Due to the greater spring-back of the tube, a leakproof connection is thus made without welding and without additional components.

The spring-back of 0.13% of the tube, with a plastic expansion value of about 1.3%, and the spring-back of 0.11% of the sleeve, with a plastic expansion value of about 5.4%, are illustrated diagrammatically in FIG. 2. The difference in the plastic expansion value is due to the fact that the sleeve lying inside is necessarily expanded to a greater extent than the tube. The essential factor is the difference between the stress values of the sleeve and the tube, which remains constant even with increasing expansion, as is seen in FIG. 2, at least in the expansion range of between 1% and 6% that is selected. The sealing action is ensured even when heat is applied at the operating site of the repaired tube, since the coefficient of thermal expansion of the sleeve is selected in such a way that the sealing action is ensured under the temperature conditions to be expected. If the difference between the stress values is selected to be at a higher value than the value of 70 N/mm$^2$ shown in FIG. 2, the difference between the spring-back values and therefore the sealing effect are increased accordingly.

In the diagrammatic illustration in FIG. 2 the same modulus of elasticity has been used for the sleeve and the tube for the sake of simplicity. The procedure according to the invention obviously also applies when the sleeve and the tube do not have the same modulus of elasticity, as long as the spring-back of the sleeve is less than that of the tube.

We claim:

1. In a method of obtaining a leakproof connection between a metallic tube having a leak and a metallic sleeve extending over the leak, the improvement which comprises:

expanding the sleeve being formed of a material having given strength values against an inner wall surface of the tube being formed of a material having strength values greater than the given strength values of the sleeve.

2. The method according to claim 1, which comprises selecting the material of the sleeve with a coefficient of thermal expansion being at least equal to a coefficient of thermal expansion of the material of the tube.

3. An improved method of plugging a leak in a metallic tube, whereby a metallic sleeve is inserted into the metallic tube and placed over the leak, and the metallic sleeve is expanded against an inner wall surface of the metallic tube, the improvement which comprises:

defining a spring-back value of the metallic sleeve and a spring-back value of the metallic tube being greater than the spring-back value of the sleeve;

expanding the sleeve outwardly against the inner wall surface of the tube;

subsequently reducing a diameter of the sleeve with a spring-back effect thereof and reducing a diameter of the tube by at least as much as the diameter of the sleeve, for forming a leak-proof seal between the tube and the sleeve.

* * * * *